Patented Nov. 8, 1949

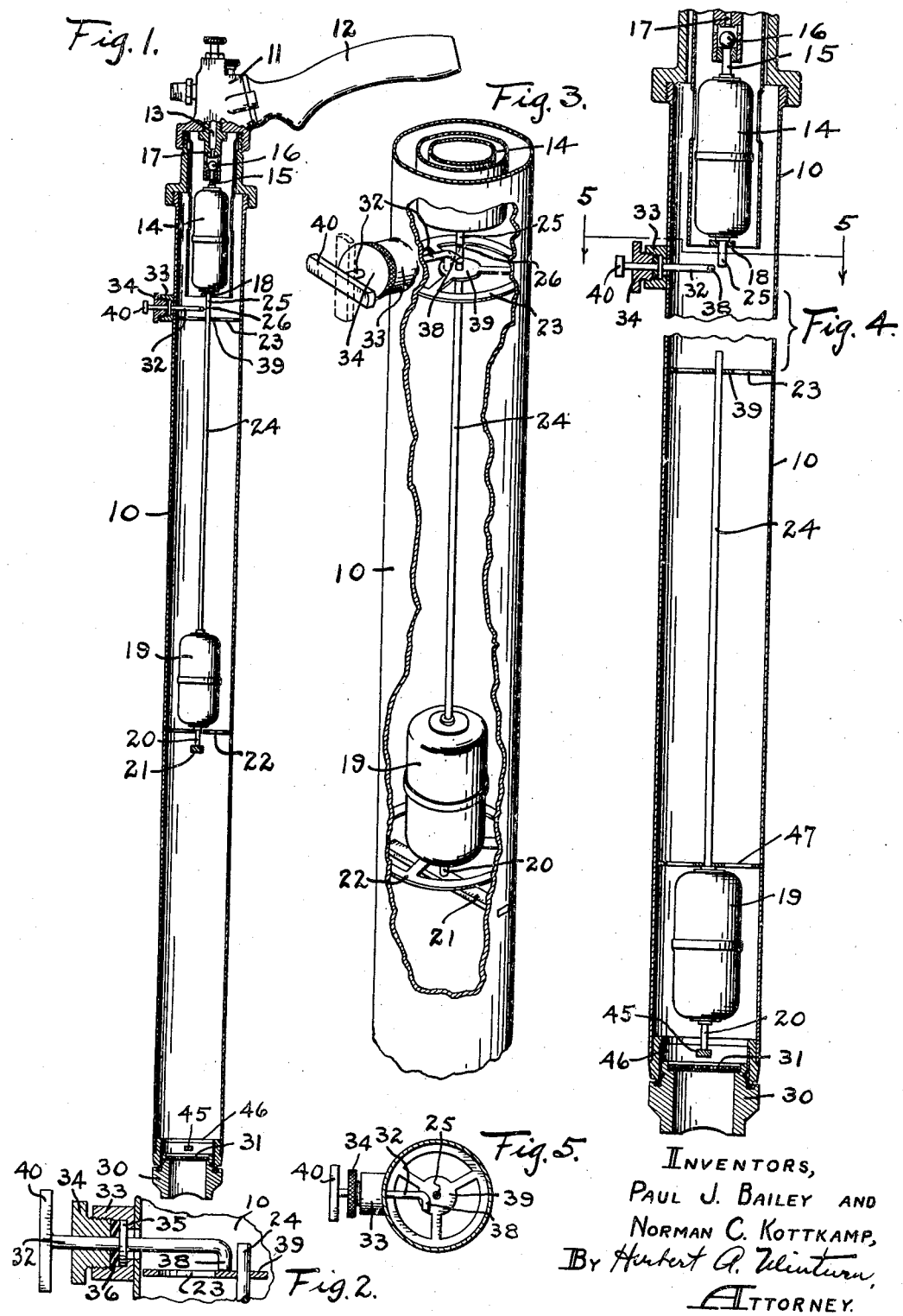

2,487,248

UNITED STATES PATENT OFFICE 2,487,248

CREAM SEDIMENT TESTER

Norman C. Kottkamp and Paul J. Bailey, Indianapolis, Ind., assignors to The Langsenkamp-Wheeler Brass Works, Inc., Indianapolis, Ind., a corporation of Indiana Application June 12, 1948, Serial No. 32,655

7 Claims. (Cl. 73—61)

This invention relates to a sediment tester particularly adapted for determining the relative amount of foreign sediment matter in cream. The procedure in securing a sample of sediment in the cream is to take a portion of the cream, a definite quantity, and then force that cream through a filter medium and then inspect the amount of sediment left on the filter medium as a means for determining the quantity of sediment appearing in the cream. It is extremely difficult to force cream particularly of high butterfat composition through the usual cotton filter disc. The practice has therefore been to dilute the definite quantity of cream with a definite quantity of hot or warm water so that the proportions are known in advance, and so that the combined volume of cream and water will be sufficiently reduced in viscosity to permit that combined quantity to be forced through the cotton filter pad or disc without undue pressure being required.

Reference is made to the Long Patent No. 2,400,154, issued May 14, 1946, and assigned to the assignee of the present application. Also further reference is made to the pending Lang application Serial No. 742,421, filed April 18, 1947. Both the patent and the application to which reference has been made embody a control head for use on milk sediment testing devices.

A primary object of the present invention is to provide a structure simplified in nature which will permit the securing of a definite quantity of water or other suitable diluent to be forced into a vessel in a measured amount, and then, thereafter, to permit a definite, measured amount of the cream to be forced into that same vessel to be intermixed with the diluent. A still further important object of the invention is to provide a structure of the nature indicated wherein the parts coming into contact with the cream or the mixture of cream with the diluent may be easily and quickly removed for cleaning operations. Again, a further important object of the invention is to provide a structure which may be quickly operated to secure the sample of cream and the diluent mixed therewith, and to eject the combination quickly and easily so that the maximum number of samples may be checked within the short time generally allotted as cream may be delivered to the stations for acceptance.

These and many other objects and advantages of the invention will become apparent to those versed in the art in the following description of two particular forms of the invention as now best known to us, and as illustrated in the accompanying drawing in which:

Fig. 1 is a view in longitudinal diametrical section through a structure embodying the invention;

Fig. 2, a detail in transverse section of a lower float limiting device;

Fig. 3, a view in side elevation and partial section of a fragment of the length of the tube or vessel employed in the invention;

Fig. 4, a view in diametrical vertical section through a modified form of structure as compared to that shown in Fig. 1; and Fig. 5, a detail in transverse section on the line 5—5 in Fig. 4.

Referring to the drawing, in which like characters of reference indicate like parts, the vessel to be considered is designated by the numeral 10 and consists of an elongated tube, preferably made out of metal for durability. At the upper end of the tube 10 there is an air pressure-vacuum control head 11. The function of this head 11 in addition to providing a handle 12 as a means for supporting the tube 10 and the other parts related thereto, is to provide at will pressure or a partial vacuum within the passageway 13 leading downwardly from the head 11. This head 11 does not form a part of the present invention per se, and is fully described and claimed in the patent above indicated, and also in the pending application also above indicated, and hence no detail thereof is herein shown.

In the form of the invention shown in Figs. 1–3, the tube carries in the upper end thereof a float 14 which has an upper stem 15 directed into the path of a ball 16 in such manner that upon raising the float 14 a sufficient distance, the ball 16 may be forced against the end of the passageway 17 leading downwardly from the larger passageway 13. All of that structure is likewise shown in the patent and application above indicated. It is sufficient to say further that the float 14 is confined to the upper end of the tube 10 by means of the cross bar 18 so that it can only drop that distance which will permit the ball 16 to be dropped from the passageway 17 to permit the pressurizing or extension of the vacuum within the tube 10. All of the structure so far described is shown and has been in use prior to the present invention, the showing being in the prior patent and prior application indicated.

Now in addition to that structure above described, there is provided a second float 19 which has a lower guide stem 20 extending downwardly to rest normally on a bar 21 extending transversely across the tube 10 to be fixed in position. That is the float 19 is normally positioned in a lowermost end of travel by reason of its stem 20 resting on the transverse bar 21. In order to center the float 19 within the tube 10, there is provided a spider 22 at the under side of the float 19 fixed to the stem 20 and coming into sliding engagement with the innerside of the tube 10 whereby the float 19 may travel freely longitudinally of the tube 10. Then in addition to the lower spider 22 there is an upper spider 23 fixed toward the upper end of a rod 24 which extends axially from the upper end of the float 19. This spider 23 is also in sliding engagement with the inside face of the tube 10. Its function is to guide the rod 24 into abutment with the lower end of the stem 25 which projects downwardly from the under end of the float 14.

In the present showing, the upper end of the rod 24 terminates at the plane 26 in which the lower end of the stem 25 terminates, in other words there is physical contact between the opposing ends of those two members. It may be however that a slight clearance can be employed between those two members without any difficulty being imposed in the operation of the device. However, there does have to be a definite relationship between the longitudinal travel of the floats 19 and 14 in conjunction with the length and diameter of the tube 10 in order that the measurement of the fluids to be carried into the tube 10 may be quite definite in character.

At the lower end of the tube 10 there is fixed removable head 30 in the usual manner which is designed to carry thereover a filter disc 31 all in the usual manner. The construction of the head 30 and the mounting of the disc 31 is likewise illustrated in the above indicated patent application, and that construction does not per se form a part of the present invention. It is necessary however to have the filter disc located in a definite position at the end of the tube 10 all in the usual and well known manner.

Toward the upper end of the tube 10 there is mounted a transverse shaft 32 which is guided through a nipple 33 fixed on the side of the tube and through a packing gland nut 34 which in the present form screw-threadedly enters the outer end of the nipple 33. As best indicated in Fig. 2, this transverse shaft 32 carries a disc 35 thereon which is urged against a seat 36 provided in the bore of the nipple 33. The disc 35 is urged into that sliding position against the seat 36 by means of the nut 34 compressively carrying packing 36 against the outer face of that disc 35. This provides also a seal against leakage both of air and of liquid through the nipple 33.

This shaft 32 enters the tube 10 to extend therewithin a distance and to have on its inner end a finger 38 turned substantially at right angles to the axis of the shaft. This finger 38 is in the path of the central portion 39 of the top spider 23. The position of the shaft 32 longitudinally of the tube 10 and the length of the finger 38 are made to be such that when the shaft 32 is rotated, the finger 38 may be turned downwardly against the disc 39 of the spider 23 as a means of retaining the spider 23 in its initial, lowermost position, and accordingly retaining the float 19 in its lowermost position. To facilitate the turning of the shaft 32, this shaft 32 is provided with an external handle 40 herein shown as consisting essentially of a bar mounted on the shaft 32 to be turned in the direction of the finger 38. In other words the position of the bar 40 will indicate the position of the finger 38 within the tube.

Now to operate the structure as shown in Figs. 1–3, the head 11 is properly manipulated so that a vacuum is produced within the passageway 13, and accordingly a vacuum is produced throughout the length of the tube 10. The head 30 is first immersed in a body of warm water or hot water so that a volume of this water may be forced into the tube 10 by reason of the vacuum therewithin. As this water is forced into the tube 10, it is forced past the filter pad 31 and up into the tube 10 a distance to cause the float 19 to float on that liquid and start traveling upwardly. In this regard, the shaft 32 is initially turned to those positions as indicated in Figs. 1 and 3 where the finger 38 is substantially horizontally disposed. That is the finger 38 is turned in a direction to be parallel with the disc 39. Then as the float 19 starts to lift, the rod 24 will push upwardly on the stem 25 of the float 14 and thereby, in turn, lift the float 14 to cause its upper stem 15 to lift the ball check 16 and close off the passageway 17 so that the pressure within the tube 10 becomes equalized as between the pressure exerted by the volume of water within the tube 10 and the atmospheric pressure outside. As above indicated, the proportions of the tube 10 and the permissible upward travel of the floats are adjusted in a predetermined manner so that there is a definite volume of water carried into the tube 10.

After this fixed volume of water is forced into the tube 10, the head 30 is then immersed in the cream which is to be checked for its sediment content. The head 11 is continued in the same condition so that a vacuum is tended to be produced in the passageway 13, and then the handle 40 is revolved to the dash line position, Fig. 3, so that the finger 38 is turned to push downwardly on the disc 39, the disc 39 not having been brought up against the finger 38 when the volume of water is pulled into the tube 10. This turning of the handle 40 causes the finger 38 to push the float 19 back downwardly so that the float 14 which is far above the top level of the water may drop by gravity and thereby release the ball 16 from its initial closing position across the lower end of the passageway 17 whereby the upper portion of the tube 10 above the volume of water is again subjected to the vacuum. Accordingly the water is pushed upwardly as the cream sample tends to enter through the head 30 and past the filter disc 31. The fluid content continues to rise within the tube 10 until its top portion reaches the float 14 and thereby carries the float 14 upwardly a distance to push the ball 16 across the passageway 17 and again shut off the withdrawal of air from the tube 10. When that is done, the filter disc 31 falls back to seat itself across the inner end of the head 30 all in the usual manner.

The head 11 is then manipulated to have pressure applied to the passageway 13 to force air downwardly therethrough and cause the ball 16 to be removed from its closing position, and to allow the pressure to force the combined water and cream content out through the filter 31 and out through the end of the head 30, thereby causing all of the fluid content to pass through the filter disc 31. Normally the water and cream content are intermixed by rocking the tube 10 before the pressure is applied to force the fluid out of the tube. Thus it is to be seen that the lower float 19 controls the volume of water initially forced into the tube 10 while the upper float 14 controls the flow of cream into the tube 10, both floats very definitely controlling and fixing the volumes of the two fluids pulled into the tube 10.

For cleaning purposes, the shaft 32 may be removed by unscrewing the nut 34, and then the head 11 together with its face or adapter 42 is unscrewed from the top end of the tube 10 so that the lower float 19 and its stem or rod 24 may be withdrawn or dropped out of the tube 10 by inverting it. Then all of the parts may be cleaned as usual and the float 19 returned to the tube and the head 11 assembled thereon for subsequent operations.

Referring to the modified form as illustrated primarily in Fig. 4, the upper structure remains the same as in the first form described. In this modified form, the float 19 is allowed to drop on down to have its stem 20 rest on the bar 45 which is normally carried diametrically across the lower end of the tube 10 in the ferrule 46 which is secured in the lower end of the tube 10, and to which ferrule the head 30 is detachably secured. This transverse bar 45 is normally provided to limit the upward travel of the filter disc 31.

The float 19 carries the stem 24 and also the lower spider 47 which is placed in this case immediately above the float 19. The stem 24 carries the spider 23 on its upper end or adjacent the upper end thereof. In this modified form, the initial fluid forced into the tube 10 will quickly start lifting the float 19 so that the stem 24 is pushed upwardly to eventually strike the stem 25 of the upper float 14. The spacing between the lower end of the stem 25 and the upper end of the stem 24 is made to be such that the exact amount of fluid will have been forced into the tube 10 as has been predetermined as being necessary by the time the float 14 is lifted to cut off the passageway 17. The transverse shaft 32 is employed in exactly the same manner as in the first form, and operates to limit the upward travel of the float 19 by having the finger 38 turned downwardly to strike the central disc 39 of the spider 23. This limitation of the upward travel of the float 19 is made for the same purpose as above indicated to prevent the stem 24 from pushing the float 14 upwardly upon the second intake of fluid, that is the intake of the cream, until the level within the tube 10 is sufficiently high to operate the float 14 independently of the float 19.

Thus it is to be seen that we have provided a very simple structure for the measurement of two distinct volumes of fluid within the same sampling tube, one volume to be measured consecutively after the other, all without involving any complicated mechanisms such as valve controls and the like. The only operating member required to be manipulated from the outside of the tube 10, that is, requiring manual operation, is the bar 40 which is turned into the two positions all as above described. Therefore, while we have described the invention in the two forms as now best known to us, it is obvious that mechanical changes may be employed without departing from the spirit of the invention, and we therefore do not desire to be limited to those precise forms beyond the limitations which may be imposed by the following claims.

We claim:

1. In a sediment tester, the combination with a vessel, means for selectively applying pressure to the vessel or to evacuate the vessel and create a vacuum in it through a passageway entering the top of said vessel means for supporting a filter disc at an intake zone of said vessel, and an upper float actuating a valve member to close off said top entering passageway when the float is lifted a predetermined degree by fluid within the vessel, of a second float carried below said upper float; a stem on said float of a predetermined length to push said upper float to its said passageway closing position upon a predetermined quantity of fluid being forced into said vessel past said filter disc upon evacuation of the vessel, and thus establishing the upper limit of level of that fluid in the vessel below said upper float; and means for lowering said lower float to drop said upper float to an open passageway position whereby further evacuation of said vessel to force in additional fluid, may cause said fluid to rise within the vessel to lift said upper float to close off said passageway and limit the total volume of fluid in the vessel.

2. In a sediment tester, the combination with a vessel, means for selectively applying pressure to the vessel or to evacuate the vessel and create a vacuum in it through a passageway entering the top of said vessel means for supporting a filter disc at an intake zone of said vessel, and an upper float actuating a valve member to close off said top entering passageway when the float is lifted a predetermined degree by fluid within the vessel, of a second float carried below said upper float; a stem on said float of a predetermined length to push said upper float to its said passageway closing position upon a predetermined quantity of fluid being forced into said vessel past said filter disc upon evacuation of the vessel, and thus establishing the upper limit of level of that fluid in the vessel below said upper float; and means for lowering said lower float to drop said upper float to an open passageway position whereby further evacuation of said vessel to force in additional fluid, may cause said fluid to rise within the vessel to lift said upper float to close off said passageway and limit the total volume of fluid in the vessel; and means supporting both of said floats at lower limits of travel when said vessel has pressure applied thereto to blow out said fluid through said disc.

3. In a fluid sediment tester, the combination with a tube, a valve head on the tube having a passageway leading into the tube, an upper float within the tube, means interposed between said upper float and said passageway whereby the passageway may be closed off upon a predetermined upward travel of that float, of a second float in the tube; means interposed between said upper and said second floats to cause the second float to actuate the first float upon fluid lifting the second float a predetermined travel; and means selectively rendering said interposed means ineffective to permit fluid in the tube to actuate said upper float to effect said passageway closure independently of said second float.

4. In a fluid sediment tester, the combination with a tube, a valve head on the tube having a passageway leading into the tube, an upper float within the tube, means interposed between said upper float and said passageway whereby the passageway may be closed off upon a predetermined upward travel of that float, of a second float in the tube; means interposed between said upper and said second floats to cause the second float to actuate the first float upon fluid lifting the second float a predetermined travel; and means selectively rendering said interposed means ineffective to permit fluid in the tube to actuate said upper float to effect said passageway closure independently of said second float; said interposed means comprising a rod extending from the second float into the path of the upper float.

5. In a fluid sediment tester, the combination with a tube, a valve head on the tube having a passageway leading into the tube, an upper float within the tube, means interposed between said upper float and said passageway whereby the passageway may be closed off upon a predetermined upward travel of that float, of a second float in the tube; means interposed between said upper and said second floats to cause the second float to actuate the first float upon fluid lifting the second float a predetermined travel; and means selectively rendering said interposed means ineffective to permit fluid in the tube to actuate said upper float to effect said passageway closure independently of said second float; said means rendering said interposed means ineffective comprising a shaft entering said tube to have an end portion adjustably shiftable by the shaft to limit the upward travel of the second float.

6. In a fluid sediment tester, the combination with a tube, a valve head on the tube having a passageway leading into the tube, an upper float within the tube, means interposed between said upper float and said passageway whereby the passageway may be closed off upon a predetermined upward travel of that float, of a second float in the tube; means interposed between said upper and said second floats to cause the second float to actuate the first float upon fluid lifting the second float a predetermined travel; and means selectively rendering said interposed means ineffective to permit fluid in the tube to actuate said upper float to effect said passageway closure independently of said second float; said interposed means comprising a rod extending from the second float into the path of the upper float; a guide carried by said stem slidable along the tube wall; and said means rendering said interposed means ineffective comprising a shaft entering said tube to extend therein above said guide, and a finger on the shaft shiftable by the shaft into the path of said guide at an elevation holding said rod below its position to elevate said upper float.

7. In a fluid sediment tester, the combination with a tube, a pressure-vacuum valve control head having a passageway leading from said head and entering the upper end of said tube, an upper float carried within said tube, passageway closing means operable by upward travel of the upper float, of a lower float freely carried within the tube; guides carried by the lower float centering its travel longitudinally of the float, said lower float being normally free to be lifted by fluid in the tube to in turn lift said upper float; and a lower float upper travel limit means comprising a shaft entering said tube, an inner member on said shaft in the path of one of said guides shiftable by said shaft to one position to hold said second float at an elevation ineffective to operate the upper float, and shiftable to a second position to permit said upper float operation by the second float.

NORMAN C. KOTTKAMP.
PAUL J. BAILEY.

REFERENCES CITED

The following references are of record in the file of this patent:

UNITED STATES PATENTS

| Number | Name | Date |
|---|---|---|
| 2,298,627 | Proudman et al. | Oct. 13, 1942 |
| 2,400,154 | Lang | May 14, 1946 |